US012594660B2

(12) United States Patent
Kuehn et al.

(10) Patent No.: US 12,594,660 B2
(45) Date of Patent: Apr. 7, 2026

(54) HAND-HELD POWER TOOL, IN PARTICULAR ROUTER AND/OR TRIMMER

(71) Applicant: Robert Bosch GmbH, Stuttgart (DE)

(72) Inventors: Thorsten Kuehn, Eislingen (DE); Michael Wall, Stuttgart (DE); Mitchell John Hubbard, Stuttgart (DE); Julius Schlicht, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 18/548,679

(22) PCT Filed: Mar. 1, 2022

(86) PCT No.: PCT/EP2022/055141
§ 371 (c)(1),
(2) Date: Sep. 1, 2023

(87) PCT Pub. No.: WO2022/194541
PCT Pub. Date: Sep. 22, 2022

(65) Prior Publication Data
US 2024/0149425 A1 May 9, 2024

(30) Foreign Application Priority Data

Mar. 15, 2021 (DE) ..................... 10 2021 202 493.9

(51) Int. Cl.
| | |
|---|---|
| *B25F 5/02* | (2006.01) |
| *B27C 5/10* | (2006.01) |
| *B23C 1/20* | (2006.01) |

(52) U.S. Cl.
CPC ............... *B25F 5/02* (2013.01); *B25F 5/021* (2013.01); *B27C 5/10* (2013.01); *B23C 1/20* (2013.01);
(Continued)

(58) Field of Classification Search
CPC ... B25F 5/02; B25F 5/021; B27C 5/10; B23C 1/12; B23C 1/20; Y10T 409/306608; Y10T 407/1948
See application file for complete search history.

(56) References Cited

U.S. PATENT DOCUMENTS 3,853,160 A * 12/1974 Posey ....................... B27C 5/10
144/144.1
4,050,003 A * 9/1977 Owings ............... H01M 50/247
439/481
(Continued)

FOREIGN PATENT DOCUMENTS

| CN | 103402716 A | 11/2013 |
|---|---|---|
| CN | 104440797 A | 3/2015 |

(Continued)

OTHER PUBLICATIONS

International Search Report corresponding to PCT Application No. PCT/EP2022/055141, mailed Jul. 6, 2022 (German and English language document) (5 pages).

*Primary Examiner* — Stephen F. Gerrity
*Assistant Examiner* — Eduardo R Ferrero
(74) *Attorney, Agent, or Firm* — Maginot, Moore & Beck LLP

(57) ABSTRACT

A hand-held power tool includes a machine housing, in which an electric drive motor is arranged that is paired with an output shaft for rotatably driving an insert tool, at least one battery pack, and a support device for guiding the machine housing on a workpiece. The support device has a support section, which has a foot plate for contacting the workpiece that includes a passage for the insert tool. The battery pack is arranged in a first machine section, the electric drive motor is arranged in a second machine section, and a handle for a user is arranged in a third machine section, at least in some sections. The three machine sections are (Continued)

arranged next to one another along a transverse axis, which is aligned at an angle to the output shaft of the drive motor.

9 Claims, 3 Drawing Sheets

(52) U.S. Cl.
CPC .................... *Y10T 407/1948* (2015.01); *Y10T 409/306608* (2015.01)

(56) References Cited

U.S. PATENT DOCUMENTS

| | | | | |
|---|---|---|---|---|
| 4,155,383 A * | 5/1979 | Welliver | .................... | B27C 5/10 83/486.1 |
| 4,187,046 A * | 2/1980 | Atherton | .................... | B27C 5/10 409/181 |
| 4,294,297 A * | 10/1981 | Kieffer | ...................... | B27C 5/10 144/371 |
| 4,561,478 A * | 12/1985 | Fields | .................. | B23Q 35/102 144/144.1 |
| 5,038,481 A * | 8/1991 | Smith | .................. | B23D 59/003 83/520 |
| 5,298,821 A * | 3/1994 | Michel | .................. | H02J 7/0042 310/47 |
| 5,902,080 A | 5/1999 | Kopras | | |
| 6,223,794 B1 * | 5/2001 | Jones | .................. | B23Q 11/005 144/135.2 |
| 6,296,065 B1 * | 10/2001 | Carrier | .................. | H02J 7/0044 173/171 |
| 6,996,909 B1 * | 2/2006 | Buck | .................. | H01M 50/204 30/DIG. 1 |
| 9,114,500 B2 * | 8/2015 | Sugita | ...................... | B24B 23/03 |
| 12,285,881 B2 * | 4/2025 | Sigafoose | .............. | B23Q 5/046 |
| 2003/0044251 A1 * | 3/2003 | Lagaly | ................ | H01M 50/244 144/136.95 |
| 2005/0072490 A1 * | 4/2005 | Baber | ...................... | B25F 5/021 144/136.95 |
| 2005/0166390 A1 * | 8/2005 | Gooding | ................ | B23D 47/12 29/527.2 |
| 2006/0032035 A1 * | 2/2006 | Phillips | ................. | B23B 47/287 144/35.2 |
| 2007/0074407 A1 * | 4/2007 | Serdynski | .............. | B23D 51/01 30/392 |
| 2013/0020106 A1 * | 1/2013 | Kuehne | ...................... | B25F 5/02 173/214 |
| 2013/0098647 A1 * | 4/2013 | Martinsson | ............... | B25F 5/02 173/217 |
| 2014/0083729 A1 * | 3/2014 | Naito | ...................... | B25F 5/001 173/217 |
| 2014/0271015 A1 * | 9/2014 | Reinwald | ................. | B23C 1/20 409/204 |
| 2014/0332243 A1 * | 11/2014 | Baskar | ...................... | B25F 5/02 173/29 |
| 2014/0360027 A1 * | 12/2014 | Emch | .................... | B23D 51/02 30/376 |
| 2016/0176038 A1 * | 6/2016 | Fisher | .................... | B25F 5/021 248/676 |
| 2017/0348842 A1 * | 12/2017 | Blum | ...................... | B24B 23/02 |
| 2018/0021973 A1 * | 1/2018 | Firth | ........................ | B27C 5/10 144/136.95 |
| 2019/0329441 A1 * | 10/2019 | Kuehn | ...................... | B27C 5/10 |
| 2019/0344461 A1 * | 11/2019 | Kamiya | .................. | B26B 25/00 |
| 2019/0358802 A1 * | 11/2019 | Trick | ........................ | B25F 5/02 |
| 2022/0297252 A1 * | 9/2022 | Riggenmann | ...... | B23Q 11/0092 |
| 2022/0388196 A1 * | 12/2022 | Osada | ...................... | B27C 5/10 |

FOREIGN PATENT DOCUMENTS

| | | | | |
|---|---|---|---|---|
| CN | 107405759 A | 11/2017 | | |
| CN | 110785264 A | 2/2020 | | |
| DE | 3815245 A1 * | 11/1989 | .............. | B27B 9/02 |
| DE | 102008055057 A1 * | 6/2010 | .......... | B23D 59/001 |
| DE | 102013205247 A1 * | 9/2014 | ............ | B23Q 9/005 |
| DE | 102016225844 A1 * | 9/2014 | .............. | B25F 5/02 |
| DE | 10 2020 206 756 A1 | 3/2021 | | |
| EP | 1 625 921 A1 | 2/2006 | | |
| JP | 2014-148017 A | 8/2014 | | |
| JP | 2016-215348 A | 12/2016 | | |
| WO | 2007/093857 A1 | 8/2007 | | |
| WO | 2021/085018 A1 | 5/2021 | | |

* cited by examiner

HAND-HELD POWER TOOL, IN PARTICULAR ROUTER AND/OR TRIMMER

This application is a 35 U.S.C. § 371 National Stage Application of PCT/EP2022/055141, filed on Mar. 1, 2022, which claims the benefit of priority to Serial No. DE 10 2021 202 493.9, filed on Mar. 15, 2021 in Germany, the disclosures of which are incorporated herein by reference in their entirety.

BACKGROUND

The disclosure relates to a hand-held power tool, in particular a router and/or trimmer, comprising a machine housing, in which an electric drive motor is arranged that is paired with an output shaft for rotatably driving an insert tool, at least one battery pack for providing energy to the electric drive motor, and a support device for guiding the machine housing on a workpiece, the support device having a support section for the machine housing, a foot plate being provided on the support device for contacting the workpiece, and the foot plate having a passage for the insert tool.

Off-grid, battery powered routers which are often manually guided are known from the prior art. Larger-sized hand-guided routers are typically designed for two-handed operation, while more compact routers with a substantially cylindrical machine housing can often be used one-handed.

The battery pack required for operation is generally placed above the drive motor for smaller designs of routers. In particular, the battery pack is arranged substantially centrally to the output shaft.

SUMMARY

The disclosure relates to a hand-held power tool, in particular a router and/or trimmer, comprising a machine housing, in which an electric drive motor is arranged that is paired with an output shaft for rotatably driving an insert tool, at least one battery pack for providing energy to the electric drive motor, and a support device for guiding the machine housing on a workpiece, the support device having a support section for the machine housing, a foot plate being provided on the support device for contacting the workpiece, and the foot plate having a passage for the insert tool. The at least one battery pack is arranged in a first machine section, the electric drive motor is arranged in a second machine section, and a handle for a user is arranged in a third machine section at least in some sections. The three machine sections are arranged next to one another along a transverse axis which is aligned at an angle, in particular at least approximately perpendicularly, to the output shaft of the drive motor.

Advantageously provided thereby is a serial, at least approximately horizontal arrangement of machine sections for the battery pack, the drive motor, as well as the handle, the machine section for the drive motor being positioned centrally between the machine sections for the battery pack and the handle. By positioning the battery pack next to the drive motor, an unfavorably high center of gravity and the associated increase in the top weight of the hand-held power tool can be avoided. Instead, in relation to a workpiece-facing side or underside of the foot plate and a top side of a workpiece being machined, this results in a particularly low center of gravity of the hand-held power tool and thus an improved weight distribution. Doing so results in lower tilting moments, particularly horizontal milling or trimming, enabling more precise work results with longer fatigue-free operation of the hand-held power tool. At least two machine sections can additionally have a vertical offset to each other with respect to the transverse axis.

According to one embodiment, the at least one battery pack is arranged on a connection interface substantially parallel to the output shaft of the drive motor on the machine housing. Preferably, the battery pack is replaceable.

Doing so makes it possible to easily and quickly replace the battery pack.

Preferably, the foot plate continues into a lateral widening section.

Doing so creates a larger contact surface of the hand-held power tool on the workpiece being machined.

According to one embodiment, the lateral widening section is supported against the support section by means of at least one support structure.

Given the preferably truss-like or strut-like support structure, a higher mechanical stability or twisting stiffness of the foot plate enlarged in area by the lateral widening section and thus the entire support device can be realized.

Preferably, the at least one battery pack is at a vertical distance from the lateral widening section of the foot plate.

A favorable weight distribution of the battery pack and electric drive motor is provided thereby.

Preferably, the connection interface is arranged at a battery-side end region of the machine housing and an electronic control device is integrated into the battery-side end region.

A short electrical connection path is as a result possible between the battery pack, the electronic control device and the electric drive motor controlled by means of the electronic control device.

Preferably, the drive motor is arranged at least in sections in an insert tool-side end region of the machine housing, which is received and fixed at least in sections in the support section of the support device.

As a result, the machine housing is reliably seated within the support device, wherein the connection between the machine housing and the support device of the hand-held power tool can be designed to be detachable or non-detachable.

Preferably, the handle in the third machine section surrounds the machine housing coaxially at least in some regions.

Doing so ensures a particularly ergonomic user guidance of the hand-held power tool.

One technically advantageous embodiment is characterized by a machine center of gravity formed at a predetermined distance relative to a workpiece-facing side of the foot plate that is less than an overall length of the machine housing, the machine center of gravity being arranged at least approximately between the first and second machine sections.

Doing so results in a substantially central alignment of the center of gravity with respect to the foot plate, which is extended by means of the lateral widening section. In addition, the center of gravity between the battery pack and the drive motor is above the support structure of the support device.

Preferably, the handle is designed for one-handed operation of the hand-held power tool.

As a result, the hand-held power tool can be operated in a simple, one-handed manner.

BRIEF DESCRIPTION OF THE DRAWINGS

The disclosure is explained in further detail in the following description with reference to exemplary embodiments shown in the drawings. Shown are.

DETAILED DESCRIPTION

Figure 1:
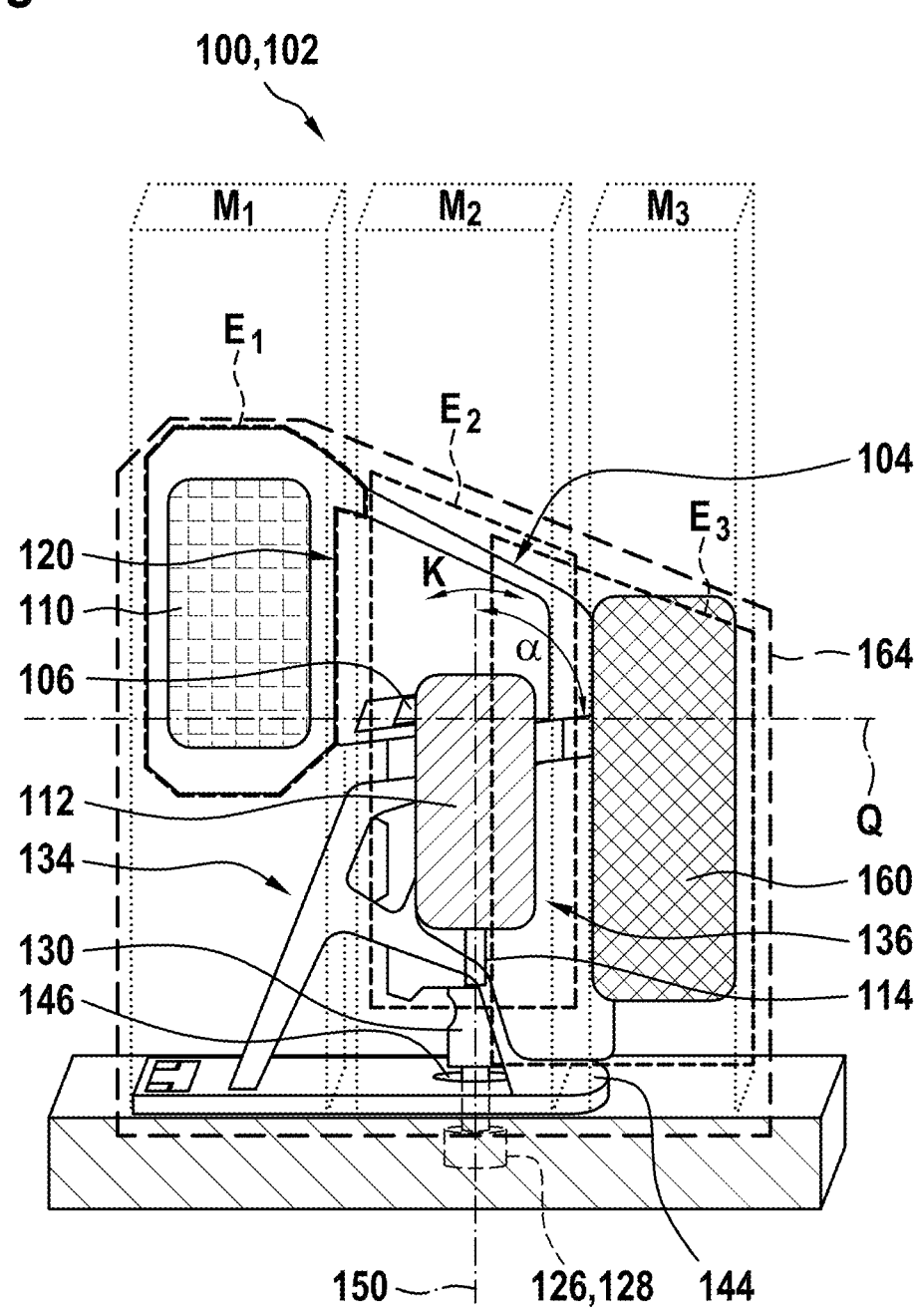
FIG. 1 a side view of a hand-held power tool having a schematically indicated location of three machine sections for a battery pack, a drive motor, and a handle, FIG. 2 a side perspective view of a hand-held power tool with a workpiece being machined according to the disclosure designed as a router, and FIG. 3 a side view of the hand-held power tool in FIG. 2 during horizontal milling and trimming operations.

Elements having the same or a comparable function are provided with the same reference characters in the drawings and are described in further detail only once.

FIG. 1 illustrates an exemplary hand-held power tool 100 illustrated as having a machine housing 104. Preferably, an electric drive motor 112 is arranged in the machine housing 104 for rotatably driving a toolholder 130 by means of an output shaft 114 of the electric drive motor 112. The hand-held power tool 100 is in this case only illustratively designed as a router 102, but can alternatively be designed as a trimmer or can be used during trimming operation (see FIG. 3).

The toolholder 130 is preferably designed to receive an insert tool 126, for example a milling tool 128, a trimmer, or the like, which is only indicated by dashed lines in the drawing. During operation of the hand-held power tool 100, a rotational movement of the electric drive motor 112 is preferably transferred to the insert tool 126 received in the toolholder 130, preferably with low loss. The output shaft 114 as well as the toolholder 130 with the insert tool 126, or its insert tool axis, is in this context designed (by way of example only) to be rotationally symmetrical to a longitudinal center axis 150.

Moreover, the hand-held power tool 100 preferably comprises an operating element 106, e.g. an electrical (sliding) switch, for switching the hand-held power tool 100 or the electric drive motor 112 on and off by a user (not shown). The electric drive motor 112 is powered by a battery pack 110 which is preferably removable from the machine housing 104, with the electrical power required for operation. The battery pack 110 is illustratively arranged on a lateral connection interface 120, preferably aligned substantially parallel to the output shaft 114 of the electric drive motor 112 on the machine housing 104, and is preferably easily replaceable. As a result, multiple battery packs 110 can be used to ensure virtually uninterrupted operation of the hand-held power tool 100, with one battery pack 110 connected to the hand-held power tool 100 via the connector interface 120, while at least one additional battery pack can, e.g., be charged in an external charging station not shown.

Moreover, a support device 134 is preferably provided for guiding the machine housing 104 on a workpiece 132, wherein preferably the support device 134 comprises a central support section 136 for the machine housing 104. A base plate 144, which is flat on the underside, is preferably formed on the support section 136 for contacting the workpiece 132. The foot plate 144 further comprises a passage 146 or an opening with a sufficiently large area for the insert tool 126.

According to one embodiment, the battery pack 110 is arranged in a first machine section $M_1$, the electric drive motor 112 is located in a second machine section $M_2$, and a handle 160 is positioned in a third machine section $M_3$ for preferably one-handed operation by the user. The handle 160 can be ergonomically designed and can, e.g., be rubberized. However, a lower or higher number of machine sections than the three machine sections $M_{1,2,3}$ (in this context by way of example only) can also be provided, in which case, however, at least two machine sections are provided.

In the context of the present description, the term "machine section" defines an abstract spatial area, zone, or installation space of the hand-held power tool 100, each associated with a functional and/or high-mass or heavy main component of the hand-held power tool 100. Such functional and/or heavy main components of the hand tool 100 can include (as shown in this context by way of example only) the electric drive motor 112, the battery pack 110, or also the handle 160 for the user. In practice, the integration of the functional and/or heavy main components takes place in real available installation spaces $E_{1,2,3}$ of the hand-held power tool 100, which are only indicated in drawings and generally occupy only a part of the respective associated machine section $M_{1,2,3}$. The installation spaces $E_{1,2,3}$ are enclosed on all sided by a structurally predetermined enveloping surface of the entire hand-held power tool 100 including the battery pack 110, the contour line 164 of which is also only suggested by drawings. Directly adjacent installation spaces $E_{1,2,3}$ can possibly overlap or penetrate each other, resulting in volume constraints for the functional and/or heavy main component to be integrated therein in each case. For example, the installation spaces $E_{2,3}$ overlap in FIG. 1, such that an installation volume of the electric drive motor 112 must be reduced at the expense of a part of the space required by the handle 160 or vice versa.

The three machine sections $M_{1,2,3}$ are positioned here substantially along a transverse axis Q adjacent to each other, i.e. lying serially one after the other, whereby the transverse axis Q extends at a predetermined angle α, in particular approximately perpendicular or at an angle α of about 90°, with respect to the output shaft 114 of the drive motor 112 with the toolholder 130 or the longitudinal center axis 150. The functional main components can be positioned at a vertical offset within the machine sections $M_{1,2,3}$ (shown by way of example in this context) relative to the transverse axis Q.

Due to the machine sections $M_{1,2,3}$, which are arranged in a disc-shaped manner next to one another or serially one after the other, with their respective associated functional main components in the form of battery pack 110, the electric drive motor 112 and the handle 160, there is an advantageous weight distribution, which results in a significant reduction in tilting moments K about the longitudinal center axis 150 and consequently enables convenient operation of the hand-held power tool 100, even during long periods of use.

Figure 2:
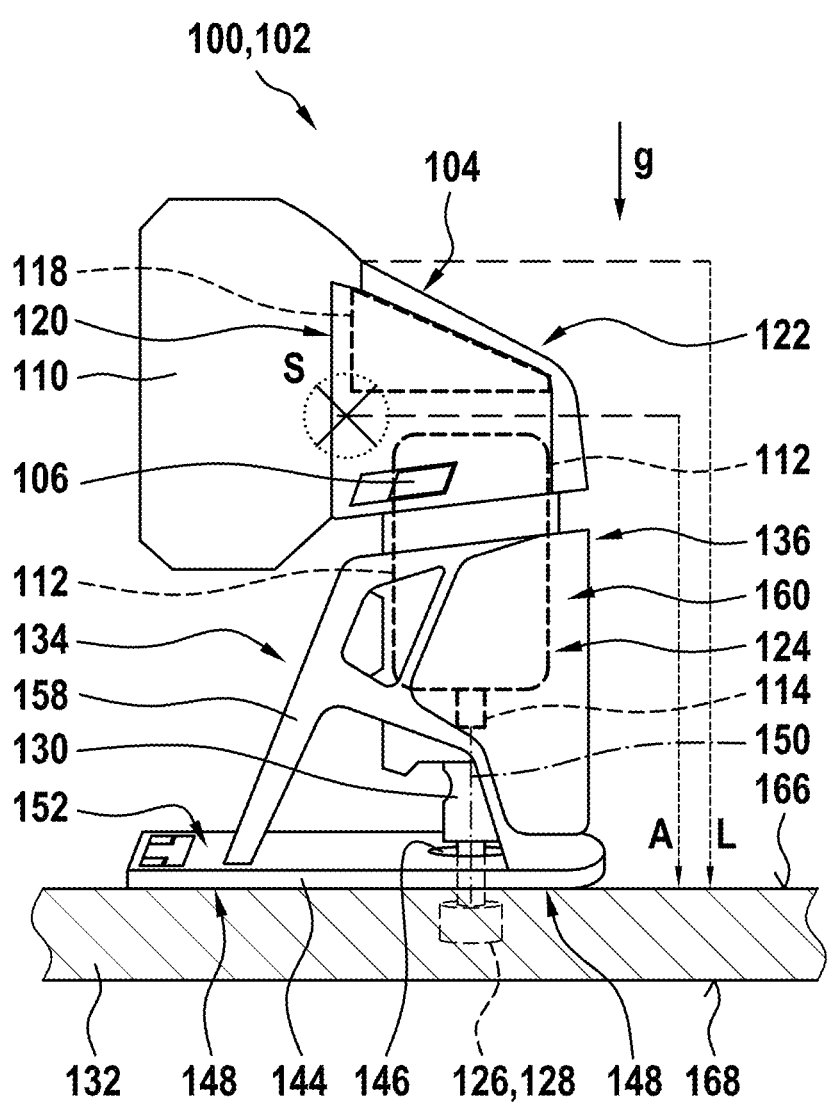

FIG. 2 illustrates the hand-held machine tool 100 of FIG. 1 used (by way of example) as a router 102, with the machine housing 104 and the electric drive motor 112 integrated therein, whose output shaft 114 rotationally drives the toolholder 130 with the insert tool 126 clamped therein in the form of the (by way of example) approximately cylindrical milling tool 128. The output shaft 114 of the electric drive motor 112, the toolholder 130 as well as the insert tool 126 and/or its insert tool axis are each designed to be rotationally symmetrical relative to the longitudinal center axis 150. During routing operation (shown by way of example in this context as well as in FIG. 1) the longitudinal central axis 150 is substantially perpendicular to a top surface 166 of the workpiece 132 being machined and approximately parallel to direction of the acceleration due to gravity g. The removable battery pack 110 is connected to the machine housing 104 via the connection interface 120. The electric drive motor 112 can be switched on and off by the user using the control element 106 and can (optionally) additionally be infinitely variable in speed.

By means of the support device 134, the hand-held power tool 100 can be guided by the user along the top side 166 of the workpiece 132. The insert tool 126 enables machining in the area of the top side 166 of the workpiece 132 up to its bottom side 168, if necessary. The support device 134 further comprises the support section 136 for receiving the machine housing 104 of hand-held power tool 100, the foot plate 144 being provided with a passage 146 for the insert tool 126 on the support section 136 and on the support structure 158.

Preferably, the foot plate 144 continues into a lateral widening section 152. A workpiece-facing side 148 of the foot plate 144 forms an enlarged, preferably continuous planar contact surface for the top side 166 of the workpiece 132, to guide the hand-held power tool 100. To increase mechanical stability, the lateral widening section 152 is preferably supported against the support section 136 of the support device 134 by at least one truss-like support structure 158.

The battery pack 110 is preferably arranged vertically spaced above the lateral widening section 152 of the foot plate 144. The battery pack 110 is preferably positioned at a battery-side end region 122 of the machine housing 104, wherein preferably an electronic control device 118 for driving the electric drive motor 112 is integrated into the battery-side end region 122. The detailed technical design of such an electronic control device 118 and the structural design of the electric, preferably electronically commutated, drive motor 112 are sufficiently familiar to a person skilled in the field of hand-hand held power tools, so a more detailed explanation can be dispensed with for the sake of brevity of the description.

Preferably, the electric drive motor 112 is arranged at least in sections in an insert tool-side end region 124 of the machine housing 104. This is preferably received at least in sections in the support section 136 of the support device 134 and fixed therein.

The handle 160 coaxially surrounds, by way of example, starting from the third machine section (see FIG. 1; reference character M₃) the machine housing 104 at least in regions. However, the handle 160 can also be used exclusively in the third machine section (see FIG. 1; reference character M₃). Preferably, the handle 160 is designed to be operated by the user with one-handed operation of the hand-held power tool 100.

The machine housing 104 of the hand-held power tool 100 illustratively has an axial length L. A machine center of gravity S is preferably at a predetermined perpendicular distance A relative to a workpiece-facing side 148 of the foot plate 144 or the top side 166 of the workpiece 132. Here, the vertical distance A is preferably less than the overall length L of the machine housing 104 of the hand-held power tool 100. In the horizontal direction, that is, parallel to the foot plate 144, the machine point S preferably lies between the first and the second machine sections (see FIG. 1; reference character M₁,₂), or between the battery pack 110 and the electric drive motor 112 in the area of the connection interface 120 of the battery pack 110.

Figure 3:
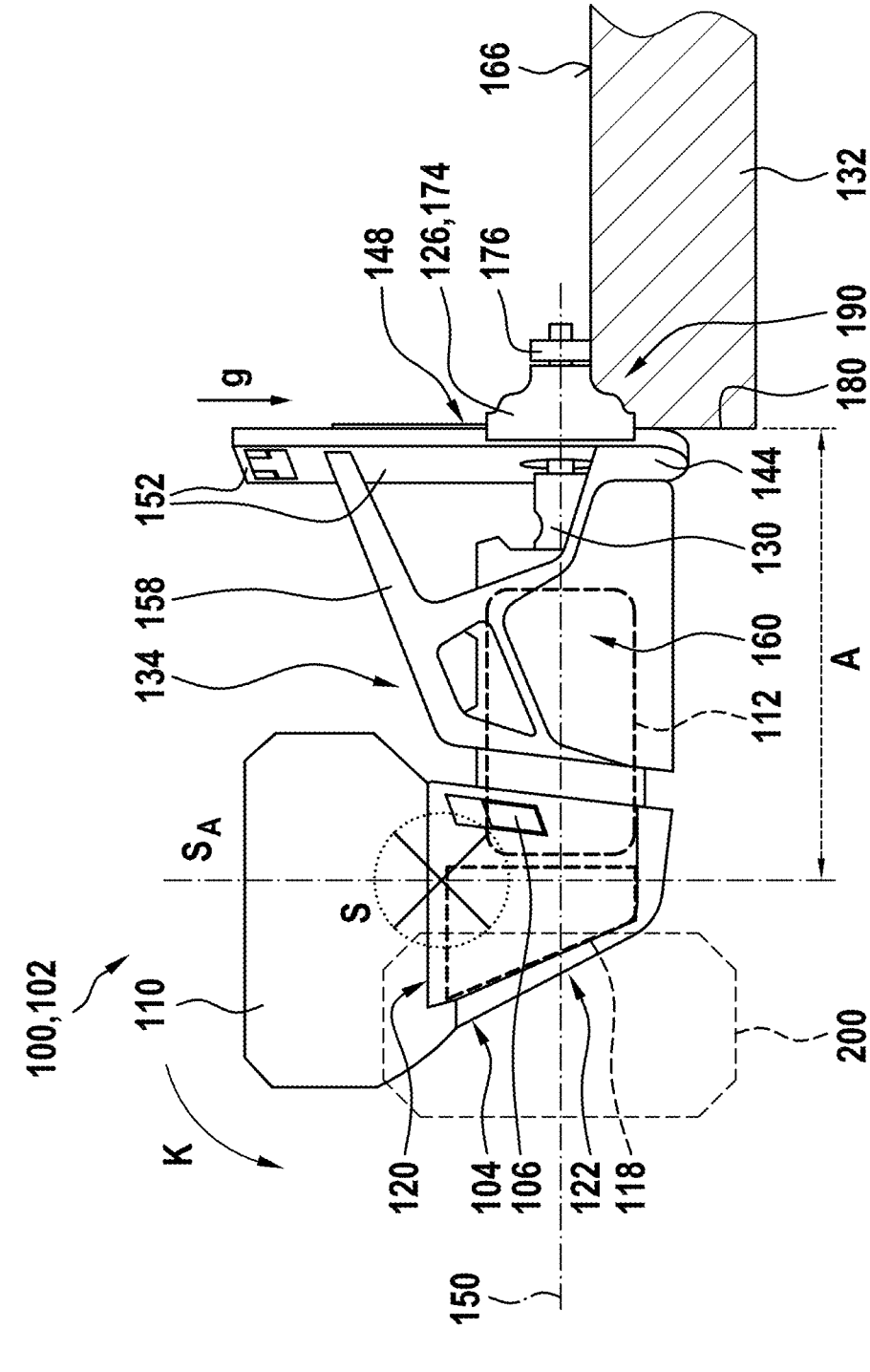

FIG. 3 illustrates the hand-held power tool 100 of FIG. 2 in an exemplary horizontal milling operation or trimming operation, respectively. Machine housing 104 of hand-held power tool 100 and/or the router 102 comprises the electric drive motor 112 for the rotating drive of insert tool 126— which is here only exemplary designed for trimming operation as a trimmer 174—and the electronic control device 118 integrated with the control element 106. The battery pack 110 is connected to the machine housing 104 via the connection interface 120. A center of gravity axis $S_A$ runs through the machine center S.

The support device 134 with the foot plate 144 oriented approximately parallel to the direction the acceleration due to gravity in deviation from FIG. 1 and FIG. 2 as well as the lateral widening section 152 formed thereon, serves in conjunction with a guide roller 176 of the trimmer 174 abutting the top side 166 for guiding the hand-held power tool 100 along an end side 180 of the workpiece 132. The end face 180, along with the top side 166 of the workpiece 132, defines a hollow-type edge 190 being milled, as exemplarily herein, and a hollow-type edge profile of the workpiece 132.

The center of gravity axis $S_A$, which runs approximately parallel to the direction of the acceleration due to gravity g and perpendicular to the longitudinal center axis 150, runs illustratively at the distance A from the end face 180 of the workpiece 132 that has not been machined by the trimming process. Due to the lateral connection of the battery pack 110 to the machine housing 104 via the connection interface 120 in the end region 122 on the battery pack side, the tilting moment K is advantageously reduced in comparison with known embodiments of hand-held machine tools—in which a battery pack 200 indicated by a dashed outline represents an axial or linear continuation of an approximately rod-shaped machine housing 104, or the battery pack 110 is designed and arranged rotationally symmetrically with respect to the longitudinal center axis 150 as an extension of the machine housing 104.

Given this advantageous weight distribution through a reduced distance A of the machine center of gravity S or the center of gravity axis $S_A$ from the workpiece 132, convenient working with the hand-held power tool 100 according to the disclosure is possible.

The invention claimed is:

1. A router or trimmer, comprising:

a machine housing;

an electric drive motor arranged in the machine housing, the electric drive motor having an output shaft configured to rotatably drive an insert tool;

at least one battery pack configured to provide energy to the electric drive motor; and a support device configured to guide the machine housing on a workpiece, the support device having a support section for the machine housing and a foot plate configured to contact the workpiece, the foot plate defining a passage for the insert tool, wherein the at least one battery pack is arranged in a first machine section, the electric drive motor is arranged in a second machine section, and a handle for a user is arranged at least partially in a third machine section, wherein the first, second, and third machine sections are arranged next to one another in order in series along a transverse axis, which defines an angle of approximately 90 degrees to the output shaft of the drive motor, wherein the foot plate includes a lateral widening section that extends from the second machine section to the first machine section, and wherein the lateral widening section is supported against the support section by a truss member that extends from the foot plate in the first machine section to the support section in the second machine section, the truss member being interposed between the at least one battery pack and the lateral widening section.

2. The router or trimmer according to claim 1, wherein the at least one battery pack is arranged at a connection interface aligned substantially parallel to the output shaft of the drive motor on the machine housing and is replaceable.

3. The router or trimmer according to claim 2, wherein the connection interface is arranged at a battery-side end region of the machine housing, and an electronic control device is integrated into the battery-side end region.

4. The router or trimmer according to claim 1, wherein the at least one battery pack is at a vertical distance from the lateral widening section of the foot plate.

5. The router or trimmer according to claim 4, wherein the drive motor is arranged, at least partially, in an insert tool-side end region of the machine housing, which is received and fixed at least in sections in the support section of the support device.

6. The router or trimmer according to claim 1, wherein the handle in the third machine section surrounds the machine housing coaxially at least in regions.

7. The router or trimmer according to claim 1, wherein:
a center of gravity of the router or trimmer is defined at
a predetermined distance relative to a workpiece-facing side of the foot plate that is less than an overall length of the machine housing, and
the center of gravity is arranged at least approximately between the first and second machine sections.

8. The router or trimmer according to claim 1, wherein the handle is designed for one-handed operation of the router or trimmer.

9. The router or trimmer according to claim 1, wherein a longitudinal center axis of the output shaft runs substantially perpendicular to a flat underside of the foot plate.

\* \* \* \* \*